United States Patent [19]

Hummel

[11] Patent Number: 4,722,876
[45] Date of Patent: Feb. 2, 1988

[54] LIQUID ACTIVATED BATTERY

[76] Inventor: Roger L. Hummel, 1539 Vanderbilt Dr., El Paso, Tex. 79935

[21] Appl. No.: 47,514

[22] Filed: May 13, 1987

[51] Int. Cl.$^4$ ............................................. H01M 6/32
[52] U.S. Cl. ..................................... 429/118; 429/110
[58] Field of Search ...................... 429/118, 119, 110; 368/64, 203, 204

[56] References Cited

U.S. PATENT DOCUMENTS

| | | | |
|---|---|---|---|
| 2,322,210 | 6/1943 | Adams | 429/118 X |
| 2,780,349 | 2/1957 | Tornberg | 206/42 |
| 3,061,659 | 10/1962 | Wilke et al. | 427/58 |
| 3,140,962 | 7/1964 | Sundberg | 429/149 |
| 3,401,063 | 9/1968 | Opitz | 429/119 |
| 3,451,855 | 6/1969 | Jones et al. | 429/119 |
| 3,477,376 | 11/1969 | Juckniess et al. | 102/399 |
| 3,507,708 | 4/1970 | Vignaud et al. | 429/86 |
| 3,597,276 | 8/1971 | Jammet | 429/151 |
| 3,791,871 | 2/1974 | Rowley | 429/119 |
| 3,943,004 | 3/1976 | Honer et al. | 429/119 |
| 3,953,238 | 4/1976 | Honer | 429/119 |
| 3,966,497 | 6/1976 | Honer | 429/119 |
| 4,007,316 | 2/1977 | Koontz | 429/119 |
| 4,192,913 | 3/1980 | Koontz | 429/119 |
| 4,425,412 | 1/1984 | Dittmann et al. | 429/53 |
| 4,463,069 | 7/1984 | Greenlee | 429/86 |
| 4,550,850 | 11/1985 | Smith et al. | 220/253 |

Primary Examiner—Anthony Skapars
Attorney, Agent, or Firm—James H. Phillips

[57] ABSTRACT

An improved long life, liquid activated battery is disclosed which employs a battery cell architecture including a metal electrode and a specially configured, multi-element carbon electrode. The carbon electrode is effected by activated carbon granules embedded in an electrically conductive adhesive in which the conductive component is a myriad of carbon particles. A conductor, which may be a carbon fiber material or a more conventional conductor, is connected to the adhesive and couples the carbon electrode through a barrier which isolates the cell chamber to provide one power input connection to a user device. The activated carbon granules serve the second function of a cell gas scavenger such that the need for providing a separate filter to perform this function is eliminated. Thus, a substantially monolithic carbon electrode within the cell chamber is effectively realized. The other electrode is a metal selected to obtain the desired cell voltage appropriate for the battery load. For such conventional circuits as watch and calculator modules, an alloy of magnesium is preferred to obtain a voltage output typically in the range 1.45 to 1.65 volts d-c.

29 Claims, 7 Drawing Figures

LIQUID ACTIVATED BATTERY

FIELD OF THE INVENTION

This invention relates to the battery art and, more particularly, to an improved battery which is activated upon the addition of a replenishable liquid which functions as an electrolyte.

BACKGROUND OF THE INVENTION

A wide variety of battery types are known, and among the known types, there is a class of batteries which remains inactive until a liquid has been introduced into the battery to provide a transfer path for exchanging ions between the battery electrodes; i.e., to function as an electrolyte. Most of the prior art batteries of this class are so called "one-shot" type in which a battery is actuated (for example, by dunking it into sea water) in response to an emergency situation requiring the generation of electricity. Such batteries may be found, again by way of example, as an adjunct to emergency radio beacon systems, emergency lights in marine environments, and similar applications. Such liquid activated batteries are particularly characterized by their relatively high current output and, most distinctly, their limited life which is generally measured in hours or even minutes.

A second type of liquid activated battery, which has in the past generally been deemed as little more than a laboratory curiosity, is a classical Voltaic battery in which two electrodes of differing (usually metal) materials (e.g., copper and zinc) are physically separated a short distance with a path for the communication of ions between the two electrodes being established by the provision of a liquid electrolyte. The production of a voltage difference, measurable between the two electrodes, is a consequence of the atomic and molecular structure of the chosen electrodes, and any current drawn from such batteries is accompanied by the deterioration of at least one electrode material such that the electrode material in the battery is eventually consumed. In a sense, the previously mentioned high current, short life, liquid activated batteries are simple extensions in scale of the laboratory battery with appropriate selection of electrodes and physical configurations to accommodate the desired application. But the much smaller scale batteries of this type, in simple configurations, have been thought to have little practical use until recently.

In recent years, there has been a substantial increase in the consumer use of portable electronic devices. Electronic wrist watches and pocket calculators, for example, have become commonplace. Miniaturization of components, reduction of electrical current demands, and drastically reduced costs, resulting from the advance of technology, as well as the manifest marketability of these devices, have been primarily responsible for the proliferation of these devices which are also remarkably reliable and have an extended service life, typically of many years.

Technology in the field of batteries for energizing such devices, however, has not kept pace. A typical electronic watch utilizes a battery of relatively small dimensions, on the order of 6.0 mm diameter and 2.0 mm thickness and having a voltage rating of approximately 1.5 volts d-c. Since such batteries are generally of the dry cell type they are not effectively rechargeable; the battery is, in effect, charged during the manufacturing process. As a result, deterioration of the charge begins immediately such that there is a distinct and notorious shelf life associated with such batteries.

Batteries of this type typically employ two electrodes of different metallurgical composition disposed in a spaced-apart relationship where the space between the electrodes is filled by a porous substance. At the time of manufacture, the porous substance is saturated with a liquid electrolyte which provides the ion transport medium between the two electrodes. In use or even while in storage, the saturated porous substance slowly "dries out"; and the efficiency of the ion transport by the electrolyte is reduced. When the efficiency of the electrolyte is sufficiently reduced, the electrical output of the battery drops to a level such that the battery is pronounced "dead." Since batteries of this type are of sealed-case construction to minimize the rate of evaporation of the electrolyte, it is not possible to revive the battery by adding or replenishing the electrolyte without damaging or destroying the sealed battery case. Substantial technology exists in the area of providing an effective seal for such batteries with the primary objective being the reduction of the rate of evaporation of the contained electrolyte when, in fact, the very presence of the effective seal works to prevent the rejuvenation of a depleted battery such as might be accomplished by introducing fresh electrolyte and flushing away the products of discharge and corrosion.

The batteries of this prior art type are also a source of aggravation and inconvenience for the consumer. Generally, even for a fully energized battery operating under light use, the maximum service life is generally in the range of 1-2 years. Further, the effective life in operation of these batteries can be substantially abbreviated under varying conditions of application such as in a frequently used calculator, an electronic wrist watch incorporating an audible alarm function, or an electronic wrist watch with an illumination source for the display area. Accordingly, periodic replacement, involving both time and expense as well as inconvenience to the device user, is absolutely necessary. In addition, an electronic device is rendered inoperative until replacement of an exhausted battery is accomplished which, in some situations, can be a genuinely serious drawback. For example, the failure of a calculator in use by a student during an examination is certainly serious to that student. For those with urgent need for the replacement battery and not in proximity to a supplier, the loss of use of the device can be extended and inconvenient to the extent of being critical. Further, in another aspect, it is possible that the chemicals within the battery may escape, such as by eroding its case, and cause damage to the powered device or even to the surrounding environment.

In recognition of these well-known drawbacks and deficiencies inherent in the prior art batteries for powering devices of this general category, a liquid activated battery has been developed and is the subject of broad patent protection sought under the Patent Cooperation Treaty by an application filed Jan. 20, 1987, in the United States Receiving Office and assigned Ser. No. PCT/US87/00058, that application being entitled "Liquid Activated Battery" by Patrick Cham Wong Chau and Roger L. Hummel. That application discloses a liquid activated battery with exemplary use in an electronic wrist watch which may be energized by immersing the watch in water or virtually any other water-based liquid to establish an electrolyte in the multi-cell battery which is incorporated into the wrist watch case. The battery, disclosed in several variant configurations in the aforementioned Patent Cooperation Treaty application, has been technically and commercially successful. However, experience has demonstrated that there are nonetheless significant drawbacks and deficiencies associated with the battery disclosed in the referenced Patent Cooperation Treaty application.

More specifically, to bring the voltage output of the battery up to the more or less standard voltage range required by miniature electronic devices such as electronic watch modules and calculator modules, a multi-cell battery, typically employing three cells, is required with a consequent significant complication in the physical requirements for establishing separate electrolyte reservoirs, reliably accomplishing intercell connection of the constituent electrodes, minimizing the intercell electrolytic actions, and accommodating other design and manufacturing considerations, all of which must be achieved in a small physical space.

There was a need in the battery disclosed in the referenced Patent Cooperation Treaty application to establish a relatively elaborate electrolyte filtering system. The system required the provision of a first filter for trapping particulate matter which might otherwise eventually form an internal short circuit within a cell or, if allowed to accumulate in sufficient volume, might clog up the works and inhibit the introduction of additional electrolyte. This filter stage took the form of a suitable absorptive cellular material, such as a synthetic sponge, which also served to hold the electrolyte. The sponges extended between the cell electrodes and essentially completely filled the cell chamber. A second, and decidedly important, filter stage included means for scavening dissolved oxygen, contaminants, and other gases from the liquid electrolyte which might be introduced into the battery to activate it. This second filter element, which could include materials such as silica gel and sintered ferrites, was preferably in the form of carbon granules which characteristically have a very high exposed area-tovolume ratio and very actively absorb such dissolved gases and organic contaminants. Those skilled in the art will appreciate that if the gases, particularly oxygen, can be separated from the electrolyte, the formation of corrosion (which is typically an oxide or hydroxide of the electrode material) at the electrode surfaces can be significantly inhibited resulting in a very much longer period in which rated electric current can be delivered by a cell.

Still another drawback to certain embodiments of the battery disclosed in the aforementioned Patent Cooperation Treaty application is the unintentional and undesirable creation of one or more secondary cells within a primary cell occasioned by the attachment of either or both of the two metal electrodes to the metallic conductors (wires, for example) used to transfer the generated electricity out of the electrolyte-filled cell area and onward to the connected load or into an adjacent "dry" compartment containing the power consuming device which might be, for example, an electronic watch module. This secondary cell phenomenon is caused when a metal conductor, such as ordinary tin-plated copper wire, is attached to (or even placed inclose proximity with) onemetal electrode within the electrolyte-filled (wet) compartment. The tin-plated copper wire and the electrode (presumedly of metallurgical composition different from that of the wire) form an unwanted secondary cell in the presence of the electrolyte. In yet another and more specific aspect, a tin-plated copper wire might be attached to a pure zinc electrode by means of tin-lead solder. Given the presence of copper (in the wire) and zinc (in the electrode) and tin and lead (in the solder) all immersed in a common electrolyte, there is provided the opportunity to create multiple secondary cells such that the output voltage of the primary cell becomes virtually unpredictable and therefore of little commercial value. The need for all of this coupling and connecting is, of course, occasioned by the requirement to connect multiple cells together in series to produce the desired output voltage and to connect one cell or a group of series-connected cells to an external load or power consuming device such as the electronic wrist watch module.

Another drawback to certain embodiments of the battery disclosed in the referenced Patent Cooperation Treaty application is the requirement for sponges or liquid-pervious materials placed within the electrolyte chambers and in direct contact with the metal electrodes. One skilled in the art of Corrosion Engineering quickly recognizes that undesirable corrosion of the metal electrodes will be accelerated by restricting the free circulation of the electrolyte (usually water) around the electrodes. To minimize the rate of electrode corrosion, it is also known that there should be a means for flushing away the products of incipient corrosion where such products are typically oxides and hydroxides of the metal used to form the electrode. Thus, while the synthetic sponge material disclosed in the referenced Patent Cooperation Treaty application operated to prevent the entry of particulate matter and other insoluble contaminants, the sponge material also operated to increase the rate of electrode corrosion and to restrict the flushing out of corrosion products from the electrolyte chamber.

A subtle drawback to the battery disclosed in the referenced Patent Cooperation Treaty application is the fact that, because of the cumulative effect of the points discussed above, it cannot, as a practical matter, be used to provide a predictable level of output voltage.

My invention is directed to the solution of all the drawbacks discussed above which are present in the prior art liquid activated batteries and which are inherent in the battery disclosed in Patent Cooperation Treaty application Ser. No. PCT/US87/00058 as noted above.

OBJECTS OF THE INVENTION

It is therefore a broad object of my invention to provide an improved battery of the class which is activated by a user by introducing a liquid electrolyte into the battery cell or cells.

It is another object of my invention to provide an improved battery of the class which is rejuvenated by a user by introducing fresh or additional liquid electrolyte into the battery cell or cells.

It is another object of my invention to provide an improved battery which is particularly well suited, in one embodiment, to permanent incorporation into an electronic device having relatively low power consumption requirements.

It is yet another object of my invention to provide an improved battery which is activated by the periodic introduction and addition of an electrolyte to a chamber or cavity constructed such that the introduction of new electrolyte causes the flushing out of the chamber or cavity to remove unwanted products of discharge and corrosion.

In a related aspect, it is an object of my invention to provide a battery in which a single cell provides a predictable voltage output and sufficient current as to directly drive electronic circuitry associated with conventional electronic devices such as electronic wrist watch and calculator circuits.

It is a still further object of my invention to provide such a battery which is relatively simple and inexpensive to manufacture and in which certain components necessary to the direct prior art batteries are eliminated.

It is still yet a further object of my invention to provide a battery in which no secondary cell effects are experienced as a result of the electrical and mechanical connections necessary to couple the electrodes to adjacent, series-connected cells of the same battery or to an external energy-consuming device to be powered by the battery.

In a different aspect, it is an object of my invention to provide such a battery which can be effectively scaled up for heavy duty use in applications requiring higher voltage and higher current outputs and in which extended service is obtained as the electrolyte is replenished from time to time.

SUMMARY OF THE INVENTION

Briefly, these and other objects of my invention are achieved by employing a battery cell architecture which includes a carbon electrode and a metal electrode. The carbon electrode is effected by activated carbon granules used in various combinations with a carbon-based electrically conductive adhesive, a carbon-filled electrically conductive elastomer, and electrically conductive carbon fibers formed into continuous strands to resemble sewing thread or kite string.

In these various combinations, a substantially monolithic carbon electrode with means for electrical connection external to the electrolyte-saturated area is effectively realized. The other electrode is a metal selected to obtain the desired cell voltage appropriate for the battery load. For such conventional circuits as watch and calculator electronic modules, an alloy of magnesium is preferred to obtain a voltage output typically in the range 1.45 to 1.65 volts d-c.

This configuration is sufficiently efficient that the office of the sponge as an electrolyte retaining means as used in the direct prior art battery is eliminated because a thin film of liquid electrolyte is all that is needed to establish ion communication between the two electrodes. The sponge may be still optionally incorporated into the cell, but only to serve its secondary office of trapping particles which may be present in the electrolyte liquid and, if incorporated, need not be in direct contact with either electrode.

The necessity for a separate gas scavenging filter is eliminated because the carbon granules, in addition to their function as one of the cell electrodes, also perform the gas scavenging operation.

DESCRIPTION OF THE DRAWINGS

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawings of which:

FIG. 3A is another enlarged detail view illustrating a first specific embodiment of the manner in which a carbon electrode of a single cell may be electrically connected to the external load or to a series-connected cell of the same battery or power-consuming device;

FIG. 3B is a view similar to FIG. 2B and taken along the lines 3B—3B of FIG. 3A;

FIG. 4A is yet another enlarged detail view illustrating a first specific embodiment of the manner in which a carbon electrode of a single cell may be electrically connected to the external load or to a series-connected cell of the same battery or power-consuming device; and FIG. 4B is a view similar to FIGS. 2B and 3B and is taken along the lines 4B—4B of FIG. 4A;

DESCRIPTION OF THE PREFERRED EMBODIMENT

Figure 1:
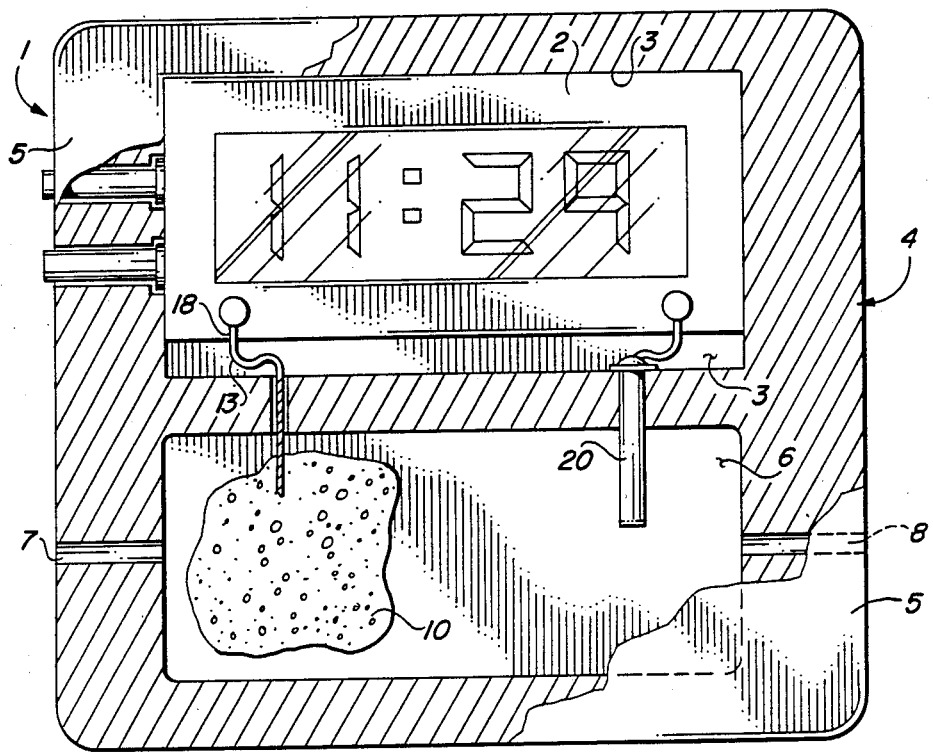
FIG. 1 is a partially cutaway plan view of the subject invention in an exemplary and somewhat simplified environment constituting an electronic wrist watch.

Referring now to FIG. 1, there is shown a liquid crystal display digital wrist watch 1 (presented as an exemplary and simplified environment with which the subject battery finds use) including a conventional watch module 2 situated in a first chamber 3 of a case 4. Watch module 2 is therefore a typical external structure or utilization device to be powered by the subject battery.

Most of the upper cover 5 of the watch 1 is shown broken away in FIG. 1 to reveal the inner structure of the assembly. A second chamber 6 houses a battery according to the present invention. As will become more apparent below, the chambers 3, 6 are isolated from one another to prevent the migration of moisture from the second chamber 6 into the first chamber 3 to thereby protect the watch module 2.

For a full appreciation of the description of the battery cell which follows, reference may be taken to FIG. 1. Chamber 6 contains a pair of battery electrodes 10, 20 coupled to energize the watch module 2 and first and second ports 7, 8 which provide fluid communication between the chamber 6 and the environment outside the case 4 to admit electrolyte, to expel gases, and to allow for the flushing out of the products of corrosion as will be described more fully below. The internal surfaces of the cell chamber 6 are non-conductive, and, preferably, the case 4 is formed of a dielectric material to achieve electrical isolation between the various components of the battery and the driven device. Thus, the case 4 may be fabricated from such thermoplastic materials as acrylic, polycarbonate, or acrylonitrile-butadienestyrene.

A fundamental feature of the subject battery is the configuration of a first electrode, generally indicated by the reference character 10 and disposed within the chamber 6. It will be apparent from the figures and the following descriptions of preferred embodiments that the first electrode 10 is assembled from component parts which are each essentially pure carbon.

Figure 2A:
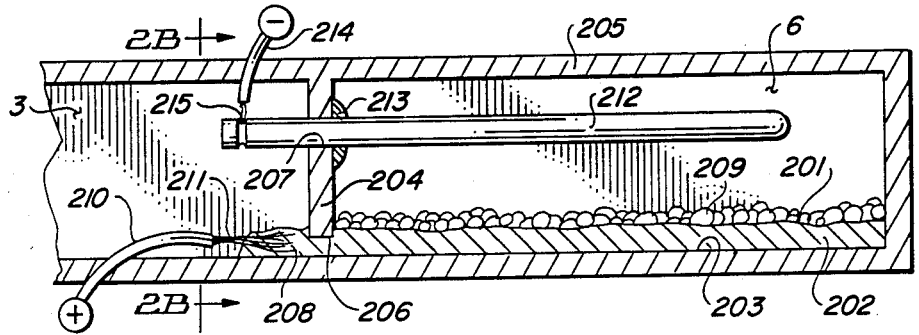
FIG. 2A is an enlarged detail view illustrating a first specific embodiment of the manner in which a carbon electrode of a single cell may be electrically connected to the external load or to a series-connected cell of the same battery or power-consuming device.

A first practical embodiment of the monolithic carbon electrode is shown in FIG. 2A. In this embodiment, the carbon electrode 201 has two fundamental constituents, both of which are essentially pure carbon and free from any extraneous metals which would introduce the unwanted secondary cell formation. The first constituent is an electrically conductive carbon-filled adhesive material 202 which has a paste-like consistency in its uncured state. The carbon-filled adhesive is emplaced as a thin layer on a substrate which may simply be one of the nonconductive inner surfaces 203 of chamber 6. Barrier 204 is integrally molded as part of case 4 and serves to prevent the migration of liquid from chamber 6 (the battery or "wet" area of case 4) into chamber 3 (the electronics or "dry" area of case 4). Barrier 204 is perpendicular to surface 203 and continuous across case 4 except for orifices 206 and 207. The carbon-filled adhesive is emplaced as a thin layer on surface 203 of chamber 6 and continuously through orifice 206 in barrier 204 such that a prolongation 208 of the carbon-filled adhesive 202 extends into chamber 3 in full electrical communication with the large area of carbonfilled adhesive disposed in chamber 6. The adhesive and gap-filling properties of material 202 serve to seal orifice 206 to prevent the migration of moisture from chamber 6 to chamber 3 while simultaneously providing an electrically conductive path between chambers 3 and 6. The electrically conductive properties of material 202 are achieved by using carbon particles; material 202 is free of metal particles which might cause the unwanted secondary cell effects. The electrically conductive carbon-filled adhesive and sealing material 202 is commercially available as "Eccobond 59K" from Emerson and Cumings of Canton, Mass.; or as "Ablebond 190-8" from Ablestik Laboratories of Gardena, Calif.

Of particular note is the curing mechanism for the Ablebond 190-8 material. This material will properly cure (harden) at room temperature, however the curing time is significantly accelerated by the presence of ordinary water. Thus the Ablebond 190-8 material is especially well suited to the instant invention in that the presence of water (which would routinely be introduced to chamber 6 during the manufacture of the battery to validate its proper operation) would accelerate the curing process and thereby provide the desired adhesive properties at an early point in the production cycle.

The second constituent of the monolithic carbon electrode 201 as shown in FIG. 2A is the conglomeration of discrete activated carbon granules 209 which are spread over the layer of carbon-filled adhesive 202 and held in place by the adhesive properties of material 202. The carbon granules are commercially available as Filtrasorb 300 and Filtrasorb 400 from Calgon Carbon Corporation of Pittsburgh, Pa.

Those skilled in the art will appreciate that the activated carbon granules 209, because of the inherent irregularities in their individual exterior surfaces, present effective surfaces of remarkable areas considering their size to correspondingly enhance their electric current handling capacities as the principal interface of the carbon electrode to the electrolyte component of the cell. It will also be appreciated that, because of the intimate contact with the individual carbon granules 209 and the conductive adhesive 202, the entire structure exhibits no appreciable electrical resistance from point to point and may, for all practical purposes, be electrically considered as a monolithic electrode at any single point including the prolongation 208 of carbon-filled adhesive material 202 which resides exterior to the wet chamber area 6.

A further consequence of the remarkable surface-area-to-volume ratio of the individual activated carbon granules 209 is their enhanced ability to scavenge dissolved gases and organic contaminants from any electrolyte with which they may come in contact. The scavenging of such contaminants, as previously noted, is important in that, particularly as to the scavenging of oxygen, the generation of an oxide layer at the surface of the metal electrode (which would present a barrier to the production of ions and hence raise the cell's internal resistance and decrease its current generation capability) is inhibited.

A subtle secondary feature of the present invention is that the contaminant-scavenging effect of the carbon granules 209 used as a constituent of electrode 201 is entirely adequate for the filtering purpose and therefore the necessity for a separate gas scavenger filter component in the cell, such as that disclosed in the previously referenced Patent Cooperation Treaty application Ser. No. PCT/US87/00058, is entirely eliminated with a consequent reduction in fabrication costs and improvement in statistical reliability.

Figure 2B:
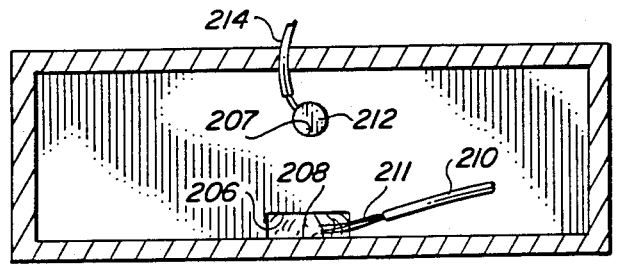
FIG. 2B is a cross sectional view taken along the lines 2B—2B of FIG. 2A to illustrate the spatial relationship between the cell electrodes as they are terminated in a "dry" chamber adjacent the cell.

A particularly important feature of the first embodiment of the present invention as seen in FIGS. 2A and 2B is the manner in which the first electrode 201 is coupled to a utilization device exterior to the wet compartment. As best seen in FIG. 2B, the mechanical connection of the metal conductor (in this case, ordinary tin-plated copper wire) is accomplished outside of the wet chamber 6 to avoid the opportunity for any secondary cell reactions to occur. The attachment of the electrical conductors of wire 210 is achieved by simply inserting the exposed end 211 of the wire from which the insulating jacket has been removed into the uncured prolongation 208 of the thin layer of carbon-filled material 202. When alowed to cure, carbon-filled material 202 holds wire strands 211 firmly in place and affords a proper mechanical and electrical connection. The free end of wire 210 can now be connected to the power-consuming device or to an adjacent cell of the same battery for series-connected operation using conventional joining techniques such as soldering or pressure connectors.

With further reference to FIGS. 2A and 2B, consider now the sum effects of the construction of the first electrode 201 and the manner in which it is coupled to the utilization device (or, for that matter, to any external power consuming structure). Within the "wet" chamber 6, the carbon-filled adhesive 202 and the carbon granules 209 may be deemed to be electrically monolithic; simply a carbon electrode in which the carbon granules 209 constitute by far the preponderance of the effective electrode area. No dissimilar metal electrical connection is made in the "wet" chamber 6 such that no secondary battery or cell effect is possible. The connection between the metallic conductor 211 and the carbon conductor 208 is performed and maintained in an electrolyte-free environment. Hence, no secondary battery effect can take place at that junction.

The second electrode 212 as shown in FIG. 2A is metallic and is selected to achieve the output voltage, when used in conjunction with a carbon electrode, appropriate for the electronic device or system being energized. This second electrode might be formed from zinc, aluminum, manganese, or various alloys thereof depending upon the output voltage desired. For the very common electronic circuits which employ complimentary metal oxide semiconductor (CMOS) technology, an exemplary voltage range is 1.45 volts to 1.65 volts d-c. For this application, it is presently preferred to use certain magnesium alloys for the second electrode. One exemplary alloy appropriate for this specific application is designated "M1" and is produced by Kaiser Chemical of Tulsa, Okla. Other suitable magnesium alloys are ordinary AZ21XA or AZ25. These alloys, in addition to providing the appropriate voltage range for the exemplary application, have secondary characteristics which are of importance. In particular, they are notably corrosion resistant such that, as previously pointed out, no separate gas scavenging filter need be incorporated into a cell according to the present invention because the activated carbon granules 209 of the carbon electrode 201 efficiently perform this office to the level required. In addition, for low power consumption applications such as that illustrated, a considerable amount of oxidation of or hydroxide buildup on the surface of the magnesium electrode 212 can be tolerated because the current generating capacity of the cell is many times that needed, even when the electrodes are very small. Merely by way of example, a typical state of the art liquid crystal display watch module requires about 2.0 microamperes. A very small battery according to the present invention, when its second electrode 212 is in pristine, essentially unoxidized condition, is readily capable of continuously supplying 2000 microamperes. When thoroughly oxidized over a long period of time and in a more or less "worst case" condition, it can still deliver on the order of 20 microamperes which is more than adequate to continue to energize several watch modules in parallel.

As seen in FIG. 2A, the second electrode 212 is in the form of a cylindrical rod and is disposed through aperture 207 in barrier 204 such that the preponderance of the surface area of electrode 212 resides within chamber 6 and is exposed to the electrolyte therein. A waterproof sealing material 213 of suitable commercial grade is employed to prevent the migration of liquid from the wet chamber 6 through aperture 207 into dry chamber 3. To avoid creating secondary cells, the attachment of the tin-plated copper wire 214 to electrode 212 is accomplished exterior to the wet chamber 6 at point 215 by using conventional wire attachment techniques well known to those skilled in the art.

Turning now to FIG. 3A, a second variation of the embodiment of the carbon electrode 301 and metal electrode 312 can be seen. As in FIG. 2A, the "dry" or electronics chamber of case 4 is designated by reference character 3 while the "wet" or battery chamber of case 4 is designated by reference character 6. Barrier 304 is integrally molded as part of case 4, is perpendicular to bottom surface 303, and is continuous across case 4 except for apertures 306, 307, and 308. The purpose of barrier 304 is to provide mechanical support for metal electrode 312 and to prevent the migration of electrolyte from chamber 6 to chamber 3.

The embodiment shown in FIG. 3A incorporates a carbon electrode 301 consisting of three constituent parts. The first part, a carbon-filled electrically conductive silicone elastomer 302, forms the base material for the carbon electrode. Preferably, the conductive elastomer is free of any metal component to eliminate the opportunity for secondary cell creation. Further, the conductive elastomer may advantageously be of the type with a pressure-sensitive adhesive on one surface; in this case, the bottom surface which joins conductive elastomer 302 to surface 303 of case 4. The conductive elastomer covers essentially the entire bottom surface of chamber 6 and is die cut to include a prolongation 305 which extends through aperture 306 into chamber 3 of case 4. The carbon-filled silicone elastomer (such as types 861, 862, 863, and 864 which are commercially available from Tecknit of Cranford, N.J.) provides an electrically conductive path from chamber 6 to chamber 3.

The second part of carbon electrode 301 is a carbon-filled electrically conductive adhesive material 309 as more fully described previously as reference character 202 in conjunction with the discussion of the first exemplary embodiment of the invention. The carbon-filled adhesive material is emplaced as a thin layer over the entire top surface of conductive elastomer 302 which therefore serves as a substrate for the layer of adhesive material.

The third part of carbon electrode 301 is the conglomeration of discrete carbon granules 310 (more fully described previously in connection with reference character 209) which are spread over the layer of carbon-filled adhesive 309 and held in place by the adhesive properties of material 309.

By further reference to FIG. 3A, it can be seen that electrode 301 is essentially monolithic carbon in construction and is free from extraneous metals which might form secondary cell reactions with either the carbon electrode 301 itself, the constituent parts thereof, or metal electrode 312. It can be further seen that a continuous electrical path is formed within the wet chamber 6 from the carbon granules 310 (which provide the preponderance of surface area for the carbon electrode) to the carbon-filled adhesive material 309 to the carbon-filled conductive elastomer 302 and that this electrical path continues exteriorly via the conductive elastomer which extends through aperture 306 as prolongation 305 which resides in dry chamber 3.

In a manner similar to that shown in FIG. 2A, the mechanical connnection of the metal conductor to the carbon electrode of the embodiment shown in FIGS. 3A and 3B is accomplished external to wet chamber 6 to avoid the deleterious effects of secondary cell formation within the electrolyte-filled chamber. The attachment of conductor 311 (in this case, ordinary tin-plated copper wire) to the exteriorly residing prolongation 305 of conductive elastomer 302 may be accomplished using an ordinary tin-plated electrically conductive tab 313. Portion 314 of tab 313 is secured under prolongation 305 by means of the pressure-sensitive adhesive on the bottom surface of conductive elastomer 302 and thus the entirety of tab 313 is in full electrical communication with the entirety of carbon electrode 301. The exposed portion of tab 313 is provided with eyelet 315 to which the stripped and tinned end of wire 311 may be attached by conventional soldering methods.

As may also be seen in FIG. 3A, second electrode 312, fabricated from a suitable metal, is formed in Ushape and disposed through apertures 307 and 308 in barrier 304 of case 4. The preponderance of the surface area of electrode 312 is exposed to the electrolyte residing in chamber 6. A waterproof sealing material 316 with suitable properties is employed at apertures 307 and 308 to prevent the migration of liquid electrolyte from wet chamber 6 to dry chamber 3. To avoid the formation of secondary cells, wire 317 is attached to electrode 312 at point 318 exterior to the wet chamber 6.

As will be readily apparent to one skilled in the art, the electrical properties and performance of the embodiment shown in FIGS. 3A and 3B will be in close agreement with those of the embodiment shown in FIGS. 2A and 2B.

Turning now to FIGS. 4A and 4B, a third embodiment of the instant ivnention involves a further variation shown as carbon electrode 401 and metal electrode 412. As in FIGS. 2A and 3A, the "dry" or electronics chamber of case 4 is designated by reference character 3 while the "wet" or battery chamber of case 4 is designated by reference character 6. Barrier 404 is integrally molded as part of case 4, is perpendicular to bottom surface 403, and is continuous across case 4 except for apertures 406, 407, and 408. In a fashion similar to the previous embodiments, barrier 404 provides mechanical support for metal electrode 412 and operates to prevent the migration of liquid from wet chamber 6 to dry chamber 4.

The embodiment shown in FIG. 4A incorporates a carbon electrode 401 consisting of three constituent parts, all of which are essentially pure carbon and free from extraneous metals which might give rise to the unwanted secondary cell actions. The first constituent part, a carbon-filled electrically conductive adhesive material 402 as more fully elaborated in connection with reference character 202, is emplaced as a thin layer on a substrate which may simply be one of the nonconductive inner surfaces 403 of chamber 6. The second constituent part of carbon electrode 401 is the conglomeration of discrete activated carbon granules 405 as more fully elaborated in connection with reference character 209. The carbon granules are spread evenly and continuously over the layer of carbon-filled adhesive material 402 and held in place by the adhesive properties of material 402.

The electrical connection from carbon electrode 401 to the external load is provided by stranded carbon fiber material 409. This material is formed from pure carbon fibers where the carbon fibers are twisted together to form a continuous element resembling black sewing thread or kite string. Material 409 is electrically conductive and is employed in the instant invention to perform a function similar to that of ordinary tin-plated copper wire.

One end of carbon fiber material 409 is disposed within the thin layer of carbon-filled electrically conductive adhesive material 402 while the other end passes through aperture 406 and into the dry chamber 3 of case 4. Upon curing, material 402 provides mechanical and electrical contact with fiber 409.

Within dry chamber 3, electrically conductive carbon fiber material 409 is mechanically and electrically connected to the stripped and tinned end 410 of tinplated coppe wire 411 by using a small dab 413 of carbon-filled adhesive material 402. In this manner, the electrical connection from the monolithic carbon electrode is accomplished exterior to the wet chamber and without using any extraneous metals within the electrolyte-filled chamber.

The carbon fiber material is available as "Graphite Fiber P-100S 2K," "Carbon Fiber P-75S 2K," "Carbon Fiber P-25W 4K," Carbon Fiber T-50 Pan 3K," and in various other designations from Union Carbide Corporation Carbon Products Division of New York, N.Y.; and from Amoco Performance Products Inc of Parma, Ohio; and from Thornel of Greenville, S.C.

With continuing reference to FIGS. 4A and 4B, the second (metal) electrode 412 is fabricated from a suitable metal and formed in a U-shape. It is disposed through apertures 407 and 408 in barrier 404 of case 4 such that the preponderance of the surface area of metal electrode 412 is exposed to the electrolyte residing in chamber 6. A waterproof sealing material 413 of suitable commercial grade is used to prevent the migration of electrolyte from wet chamber 6 to dry chamber 3 through apertures 407 and 408. To prevent the formation of the deleterious secondary cells within the wet chamber 6, the stripped and tinned end of wire 414 is attached to metal electrode 412 at point 415 exterior to the wet chamber.

As will be apparent to one skilled in the art, the performance of the variant of the instant invention as elaborated in FIGS. 4A and 4B will be similar to that shown in FIGS. 2A and 3A.

Referring again to the generalized view presented in FIG. 1, the entire system, represented by the electronic wrist watch 1, may be supplied to an end user with its battery in the inactive state brought about by the absence of any electrolyte in the chamber 6. Simply dunking the entire assembly in a water based liquid, including ordinary tap water, results in the introduction, through the ports 7 and/or 8, of the liquid in sufficient quantity to establish a continuous volume, or even film, of electrolyte between the metal and carbon electrodes to activate the battery in a completely "fresh" state. Thereafter, from time to time, the supply of electrolyte need only be replenished to make up any losses due to evaporation and, when necessary, to flush out the products of corrosion. The electrolyte level need be maintained only to the extent necessary to provide at least a continuous film of electrolyte between the metal and carbon electrodes. Intermediate the activation and reactivation operation (which, according to the environment, might be repeated only every few weeks), gases from the electrolyte are routinely vented to the environment through the ports 7 and 8.

The subject battery is adaptable to applications in which higher voltages and/or very much higher electrical currents are required by the utilization device by increasing the size of each cell and connecting the cells in appropriate series and parallel arrays. For very difficult duty, cells are contemplated in which the surface areas of the electrodes are increased manifold to obtain the necessary current capacity. Conversely, the subject battery is particularly well suited to miniature configurations in round, rectangular, or such other shapes as may be well adapted for incorporation in electronic wrist watches of diverse styles and for other low power applications in which the shape of the battery must be accommodated to a given device.

Therefore, while the principles of my invention have been made clear in the foregoing description of an exemplary embodiment, it will be obvious to those skilled in the art that various modifications may be made to accommodate specific operating requirements and environments. The appended claims are intended to cover and embrace any such modifications within the limits only of the true spirit and scope of the invention.

I claim:

1. A battery cell coupled to electrical power utilization structure external said cell, said cell comprising:

(A) a cell chamber having non-conductive internal surfaces;
(B) a metal electrode situated in said cell chamber, said metal electrode being electrically coupled to a first position outside said cell chamber and to the external structure;
(C) a carbon electrode situated in said cell chamber and disposed in physically non-contacting relationship with said metal electrode, said carbon electrode including:
  1. a first quantity of conductive, curable paste applied as a layer on a substrate;
  2. a plurality of activated carbon granules embedded in said layer of conductive paste; and
  3. conductive means electrically coupled to said conductive paste, said conductive means coupling said carbon electrode to a second position outside said cell chamber; and
(D) means for selectively introducing a liquid electrolyte into said cell chamber;
(E) means for flushing out contaminants and other extraneous material which may collect in said cell chamber;
whereby, introduction of a liquid into said cell chamber in sufficient quantity as to establish a path of electrolyte between said carbon electrode and said metal electrode activates said cell.

2. The cell of claim 1 in which said conductive means is a carbon fiber material formed into continuous strands and in which one end of said carbon fiber material is embedded in said conductive paste.

3. The cell of claim 1 in which said conductive paste is impregnated with carbon particles.

4. The cell of claim 2 in which said conductive paste is impregnated with carbon particles.

5. The cell of claim 3 in which said conductive paste is water curable.

6. The cell of claim 4 in which said conductive paste is water curable.

7. The cell of claim 1 in which said substrate is an interior surface of said cell chamber.

8. The cell of claim 2 in which said stranded carbon fiber material extends to said second position outside said cell chamber and which further includes:
(A) a second quantity of conductive, curable paste disposed at said second position; and
(B) a metallic conductor having an end embedded in said second quantity of conductive paste, said metallic conductor being electrically coupled to the external structure;
whereby, a complete conductive path between said carbon electrode and the external structure is established.

9. The cell of claim 1 in which said metal electrode is fabricated from a magnesium alloy selected to provide a cell output voltage, when used in conjunction with a carbon electrode, falling within the range of about 1.45 volts to about 1.65 volts.

10. The cell of claim 1 in which said substrate is a conductive elastomer affixed to an interior surface of said cell chamber.

11. The cell of claim 10 in which said conductive elastomer includes a a prolongation which extends to said second position position outside said cell chamber to effect said conductive means.

12. The cell of claim 11 in which said conductive paste is impregnated with carbon particles.

13. The cell of claim 12 in which said metal electrode is fabricated from a magnesium alloy selected to provide a cell output voltage, when used in conjunction with a carbon electrode, falling within the range of about 1.45 volts to about 1.65 volts.

14. A liquid activated battery for energizing a utilization device by applying a potential across first and second input terminals and supplying current to the device, said battery consisting of at least one cell, each said cell comprising:
(A) a cell chamber having non-conductive internal surfaces;
(B) a metal electrode situated in said cell chamber, said metal electrode being electrically coupled to the first input terminal of the utilization device;
(C) a carbon electrode situated in said cell chamber and disposed in physically non-contacting relationship with said metal electrode, said carbon electrode including:
  1. a first quantity of conductive, curable adhesive paste applied as a layer on a substrate;
  2. a plurality of activated carbon granules embedded in said layer of conductive adhesive paste; and
  3. conductive means electrically coupled to said conductive paste, said conductive means coupling said carbon electrode to the second input terminal of the utilization device; and
(D) means for selectively introducing a liquid electrolyte into said cell chamber;
(E) means for flushing out contaminants and other extraneous material which may collect in said cell chamber;
whereby, introduction of a liquid into all said cell chambers of said battery in sufficient quantity as to establish a path of electrolyte between said carbon electrode and said metal electrode in each said cell activates said battery.

15. The battery of claim 14 in which said conductive means is a carbon fiber material formed into continuous strands and in which one end of said carbon fiber material is embedded in said conductive paste.

16. The battery of claim 14 in which said conductive paste in impregnated with carbon particles.

17. The battery of claim 15 in which said conductive paste is impregnated with carbon particles.

18. The battery of claim 16 in which said conductive paste is water curable.

19. The battery of claim 17 in which said conductive paste is water curable.

20. The battery of claim 14 in which said substrate is an interior surface of said cell chamber.

21. The battery of claim 15 in which said carbon fiber stranded material extends to a position outside said cell chamber and which further includes:
(A) a second quantity of conductive, curable paste disposed outside said cell chamber; and
(B) a metallic conductor having an end embedded in said second quantity of conductive paste, said metallic conductor being electrically coupled to the utilization device second terminal;
whereby, a complete conductive path between said carbon electrode and the second terminal of theutilization device is established.

22. The battery of claim 14 in which said metal electrode is fabricated from a magnesium alloy selected to provide a cell output voltage, when used in conjunction with a carbon electrode, falling within the range of about 1.45 volts to about 1.65 volts.

23. The battery of claim 14 in which said substrate is a conductive elastomer affixed to an interior surface of said cell chamber.

24. The battery of claim 23 in which said conductive elastomer includes a prolongation which extends to said second position position outside said cell chamber to effect said conductive means.

25. The battery of claim 24 in which said conductive paste is impregnated with carbon particles.

26. The battery of claim 25 in which said metal electrode is fabricated from a magnesium alloy selected to provide a cell output voltage, when used in conjunction with a carbon electrode, falling within the range of about 1.45 volts to about 1.65 volts.

27. The battery of claim 14 which comprises a plurality of said cells connected in series.

28. The battery of claim 14 which comprises a plurality of said cells connected in parallel.

29. The battery of claim 14 which comprises a plurality of said cells connected in a series/parallel array.

* * * * *